Patented Mar. 1, 1927.

1,619,202

UNITED STATES PATENT OFFICE.

CHARLES J. GREENSTREET, OF CHICAGO, ILLINOIS.

POWDERED SOLUBLE FRUIT, VEGETABLE, OR OTHER EDIBLE NATURAL OR MANUFACTURED SUBSTANCES AND PROCESS OF MAKING A POWDERED FRUIT, VEGETABLE, OR OTHER EDIBLE SUBSTANCE OR COMPOSITION.

No Drawing.     Application filed September 13, 1923. Serial No. 662,444.

The present invention relates to a new composition of matter in the form of a powdered, yet soluble form of a fruit, vegetable or other natural edible substance and a process of making a product of such materials and having such characteristics.

There is a great waste of certain of the natural edible substances, such as fruits, vegetables and the like, due to slight imperfections which cause the same to be discarded or due to the spoilation of the same in transit from the place of growth to the points of consumption and for many other reasons. In addition, there are many inconveniences, such as in the storing, refrigerating, transporting, delivering and selling of various fruits, vegetables or other compositions as well as inconveniences in the actual form of the product when served as an edible which I overcome by the present invention.

In addition to this, much of the value and desired substance of the edible product in mind is never used and a great percentage of the total substance of a lemon, orange, citrus fruit, grape fruit or vegetable is not used because of the lack, to my knowledge, of means for preserving and presenting for use substantially the entire original, natural composition in such form as to be capable of the use intended as, for example, the skin and many of the oils therein of a lemon, orange, or the like usually never wholly used at all.

I have discovered that I can take a natural edible substance such as a fruit or a vegetable and divide the same into such fine molecular or particled condition that substantially the entire substance of the original product will form a substantially stable mixture, solution, or composition with certain carriers such as natural waters, mineral waters, or manufactured waters or carbonated waters, or any other liquid carriers in which, notwithstanding the difference in molecular weight of the two, the substance and liquid carrier, yet due to the minute molecular state approaching the colloidal condition of the edible substance, these compositions in their substantially entirety may be rendered available for use in an infinite variety of manner of uses in which any edible may be served or used.

I have also discovered that when such a mixture of an extremely divided, original edible substance and a liquid carrier such as water, for example, was treated to drive the water off, a powdered, soluble, substantially permanent non-fermenting edible product of great concentration and value remains.

One process I have invented for producing such novel composition of matter which comprises grinding or pulping a natural edible substance such as a lemon, orange, or other citrus fruit, grape fruit or vegetable, as well as numbers of manufactured products, such as catsup or the like, to an exceedingly fine degree, during which I preferably mix therewith from one to two parts of a liquid temporary or even permanent carrier such as water, although the same may be reduced to the proper size in certain instances without the use of such carrier or water, or on the other hand, the carrier may be added later. If desired, I may reinject the pulpy matter into a mixture of pulp and water which is in the process of being worked. There are various types of pulp digestors and mechanical apparatus which may be employed in my process for reducing the entire original, natural edible substance into a proper degree of minute, molecular or colloidal state.

Assuming that the ground pulpy matter has been mixed with a suitable carrier, such as a natural water which may be preferred on account of its cheapness, and either run through the pulp mechanism once or rerun sufficiently until practically the entire original composition is formed into a substantially stable mixture, or a mechanical solution as it were, with a water carrier, the product may be desirably then worked up or coarse sprayed in a suitable tank to have the effect of further atomizing, breaking up or reducing the fineness of the size of the original substance particles to obtain the desired stability, either temporary or permanent, of the product in the carrier or solution, the value of which resides in thereby assuring the operator that the original edible substance has been sufficiently divided for the purposes intended or desired to approach or assume colloidal or very fine condition.

Wherever in the specification or claims I refer to the mixture of the powdered material and water as a substantial stable mixture, I refer to the fact that the material is reduced to such a fine state of subdivision or comminution that, when mixed with a liquid carrier, some of it passes into solution and the insoluble particles form a permanent suspension with the liquid carrier and do not settle so as to form a sediment upon standing. Whenever I refer to the material as being in the colloidal state, I mean that it is so finely subdivided or comminuted as to be permanently suspended in the liquid carrier and form a permanent suspension or colloidal solution therewith.

The substance, thus made, may in itself constitute a convenient commercial product easily to be collected, stored, transported, sold and used from sealed receptacles having the advantages hereinabove indicated or suggested.

However, as an object of my invention, I propose to form a powdered, soluble, edible product of material of the character indicated and hence the material operated upon thus far may be passed through a heated chamber under a vacuum to drive off the water, care being taken, however, to avoid volatilization of any of the solid or oily constituents of the edible product, such as a lemon, for example, whereupon the product left is in a powdered highly concentrated, particularly efficient form, as above indicated, as all of the substances of the original article are retained therein, including the pulpy substance, the juices, the skin or rind and the oils thereof, and even seeds are thoroughly ground up and retained and included in the total powdered resultant product. In some cases, the seeds contain undesirable ingredients, as in the case of peach pits, and are to be rejected or eliminated. Various types of vacuum evaporation may be employed for removing the water or other fugitive carrier, leaving the product in the powdered form indicated.

The resultant powdered product is stable, non-fermentable and can be kept indefinitely in such shape. It can be shipped, stored, sold, delivered and used directly as a powder. In addition, however, it is readily soluble in water and other liquids and may be used to make various kinds of beverages such as lemonade, and the like, depending on the original edible substance used. In the process of manufacture, a sweetening substance such as sugar, saccharin or the like may be used so that a lemonade may be made for example, by merely dissolving a small quantity of the powdered concentrated material directly in a glass of water.

The invention I have made as indicated above, I believe to be of great importance since the original fruit, vegetable or other edible substance is practically usable in its entirety with practically no loss whatever as it is even possible to use the seeds of the fruit in my product and by my process. The powdered product may be easily transported, sold and handled in the channels of commerce with or without sealing against the atmosphere with no danger of fermentation or spoiling in any way whatsoever. On the other hand, the same is mixable with water to substantially the same effect as being soluble or is soluble therein. By reason of the molecular state of the substance whether or not in some instances the same may be chemically soluble, in either event a peculiar and desirable characteristic is the readiness in which the same may be put to all uses and purposes or practically dissolved in various forms of liquid carriers such as water, for example.

Wherever in the specification and claims I use the term fruit, I have used the term in its broad sense as including any vegetable product used as a food, and I am not, therefore, to be restricted to a narrower use of this term.

It is apparent that within the spirit of the invention, modifications and different arrangements may be made other than as herein disclosed, and the present disclosure is illustrative merely, the invention comprehending all variations thereof.

Having thus described my invention, what I desire to secure by Letters Patent of the United States and claim is:

1. A composition of matter comprising substantially all the constituents of a natural fruit chemically unchanged and reduced to such a fine state of subdivision as to form a colloidal solution in the presence of water.

2. A composition of matter consisting of a dry powder comprising substantially all the constituents of a natural fruit chemically unchanged and reduced to such a fine state of subdivision as to form a colloidal solution in the presence of water.

3. A composition of matter comprising substantially all the palatable constituents of a natural fruit chemically unchanged and reduced to a powdered state in which it is substantially stable in water.

4. A composition of matter consisting of a dry powder comprising substantially all the palatable and normally soluble constituents of a natural fruit chemically unchanged, and reduced to such a state of subdivision as to be substantially stable in water.

5. A composition of matter consisting of a dry powder comprising substantially all the constituents of a natural, edible substance including both juices and fibrous structure, chemically unchanged and reduced to that fine state of subdivision characteristic of the colloidal state.

6. The process of making a powdered edible substance comprising the reduction of a natural edible substance including both juices and fibrous structure to the colloidal state in the presence of a liquid carrier, and evaporating to dryness the resultant colloidal solution.

7. The process of making a powdered edible substance comprising the reduction of a natural edible substance including both juices and fibrous structure to the colloidal state in the presence of water, and evaporating to dryness.

8. The process of making a powdered edible substance comprising the reduction of a natural fruit to the colloidal state, and evaporating to dryness.

9. The process of making a powdered edible substance comprising the reduction of a natural fruit to the cololidal state in the presence of a liquid carrier, and evaporating the resultant colloidal solution to dryness.

10. The process of making a powdered edible substance comprising the reduction of a natural fruit to the colloidal state in the presence of water, and removing said water by evaporation.

11. The process of making a powdered edible substance comprising the reduction of a natural fruit to the colloidal state while retaining chemically unchanged substantially all the constituents of said natural fruit and evaporating to dryness.

In testimony whereof, I affix my signature.

CHARLES J. GREENSTREET.

evaporating to dryness the resultant colloidal solution.

7. The process of making a powdered edible substance comprising the reduction of a natural edible substance including both juices and fibrous structure to the colloidal state in the presence of water, and evaporating to dryness.

8. The process of making a powdered edible substance comprising the reduction of a natural fruit to the colloidal state, and evaporating to dryness.

9. The process of making a powdered edible substance comprising the reduction of a natural fruit to the cololidal state in the presence of a liquid carrier, and evaporating the resultant colloidal solution to dryness.

10. The process of making a powdered edible substance comprising the reduction of a natural fruit to the colloidal state in the presence of water, and removing said water by evaporation.

11. The process of making a powdered edible substance comprising the reduction of a natural fruit to the colloidal state while retaining chemically unchanged substantially all the constituents of said natural fruit and evaporating to dryness.

In testimony whereof, I affix my signature.

CHARLES J. GREENSTREET.

CERTIFICATE OF CORRECTION.

Patent No. 1,619,202.  Granted March 1, 1927, to

CHARLES J. GREENSTREET.

It is hereby certified that error appears in the printed specification of the above numbered patent requiring correction as follows: Page 2, line 114, claim 4, for the word "soluble" read "insoluble"; and that the said Letters Patent should be read with this correction therein that the same may conform to the record of the case in the Patent Office.

Signed and sealed this 21st day of June, A. D. 1927.

Seal.

M. J. MOORE.
Acting Commissioner of Patents.

CERTIFICATE OF CORRECTION.

Patent No. 1,619,202.   Granted March 1, 1927, to

CHARLES J. GREENSTREET.

It is hereby certified that error appears in the printed specification of the above numbered patent requiring correction as follows: Page 2, line 114, claim 4, for the word "soluble" read "insoluble"; and that the said Letters Patent should be read with this correction therein that the same may conform to the record of the case in the Patent Office.

Signed and sealed this 21st day of June, A. D. 1927.

Seal.

M. J. MOORE.
Acting Commissioner of Patents.